Patented July 3, 1945

2,379,460

UNITED STATES PATENT OFFICE 2,379,460

TREATMENT OF RUBBER

Winfield Scott, deceased, late of Akron, Ohio, by Ruth P. Scott, executrix, Akron, Ohio, assignor to Wingfoot Corporation, Akron, Ohio, a corporation of Delaware No Drawing. Application August 12, 1943, Serial No. 498,397

8 Claims. (Cl. 260—783)

This invention relates to the preservation of rubber and more particularly to the use of a new class of age resisters for rubber.

Many materials have been employed to improve the resistance of rubber to deterioration through aging. The relative effectiveness of such materials as well as their specific effect as antioxidants, flex improvers, etc. varies greatly. By the present invention, a new class of very effective age resisters is provided for rubber.

It is known that p-benzoquinone and conjugated dienes, such as butadiene-1,3, react to give polycyclic compounds. For example, p-benzoquinone and butadiene-1,3 react as follows:

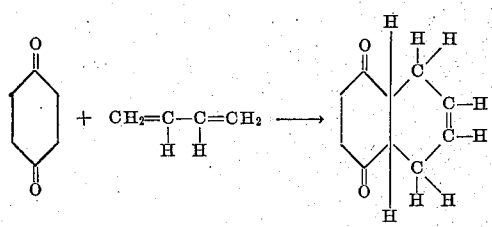

The resulting product is tetrahydro-1,4-naphthoquinone; more exactly, 4a,5,8,8a-tetrahydro-1,4-naphthoquinone. This is a pale yellow, crystalline material melting at 55–60° C. and extremely soluble in benzene. The preparation of this material is illustrated by the following example:

Example 1

Fifty-five grams of p-benzoquinone were suspended in 100 cc. of benzene and butadiene gas was bubbled into the mixture until the bottle and contents increased in weight by about 32–35 grams. The mixture was then allowed to stand for 5 days at room temperature with occasional shaking. The benzoquinone slowly disappeared, having gone completely into solution after 2 days. The benzene was then distilled from the solution and the liquid residue was cooled. When crystallization began, several volumes of petroleum ether were added. The crystals were filtered off and washed with more petroleum ether. Seventy-eight grams of gray crystals were obtained, amounting to 96% of the theoretical yield.

This material was incorporated into rubber in accordance with a standard testing formula and was aged for 6 days in an oxygen bomb at 50° C. and 150 lb. pressure. A control using phenyl-beta-naphthylamine, a commercial age resister, was tested under comparable conditions. The ratio of the tensile strengths before and after aging was:

| | Before aging | After aging |
|---|---|---|
| | Per cent | Per cent |
| Phenyl-β-naphthylamine | 100 | 97 |
| Tetrahydro-1,4-naphthoquinone | 100 | 135 |

In addition to the parent butadiene-1,3 employed in the foregoing example, compounds in which one or more of the hydrogens is replaced by a substituent group may also be used. Further examples are isoprene; 4-methyl-1,3-pentadiene; 1,3-pentadiene and 1-phenyl-1,3-butadiene.

Various other 1,4-quinones may also be used, including 1,4-naphthoquinone, 1,4-phenanthraquinone and 1,4-anthraquinone. Also, the quinones may contain various substituents such as alkyl, aryl, aralkyl, halogen, hydroxyl and similar groups, such substituted compounds being equivalents of the parent compounds for purposes of this invention.

Tetrahydro-1,4-naphthoquinones obtained as in Example 1 will further react with butadienes at somewhat elevated temperatures, to produce polyhydroanthraquinones, for example, at about 80–170° C. At such temperatures, the reaction is carried out under pressure in order to prevent loss of material. Alternatively, one mol of the p-benzoquinone may be reacted under similar conditions of temperature and pressure with two mols of a 1,3-butadiene. Thus, p-benzoquinone and butadiene-1,3 will yield the octohydroanthraquinone of the following formula:

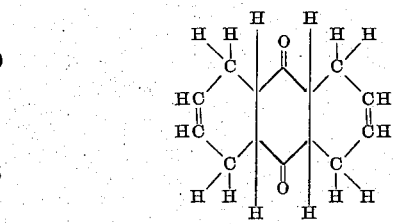

The products obtained by the reaction of 1,4-quinones and 1,3-butadienes may be designated tetrahydro polycyclic quinones. In accordance with this terminology, the octahydroanthraquinone formed by the reaction of one mol of p-benzoquinone with two mols of butadiene-1,3 may be regarded as a di(tetrahydro) polycyclic quinone.

Further examples of such tetrahydro polycyclic quinones are 6-methyl-4a,5,8,8a-tetrahydronaphthoquinone
5-dimethyl-4a,8,8a-trihydronaphthoquinone
5-methyl-4a,5,8,8a-tetrahydronaphthoquinone
5-phenyl-4a,5,8,8a-tetrahydronaphthoquinone.

Any such tetrahydro polycyclic quinones may be incorporated into rubber as age resisters.

The tetrahydro polycyclic quinones of the invention are readily converted into the corresponding hydroquinones by warming with a trace of hydrogen bromide as a catalyst. This is demonstrated by the following example:

*Example 2*

Twenty-six grams of 4a,5,8,8a-tetrahydro-1,4-naphthoquinone were dissolved in 75 cc. of acetic acid. The solution was warmed to 80° C. and one drop of concentrated hydrobromic acid was added. A vigorous exothermic reaction occurred, the temperature running up to 110–115° C. while a mass of white crystals separated. These, after cooling, were filtered off and washed with petroleum ether. The yield was 24 grams or 92.5% of the theoretical. The crystals melted at about 208–209° C. and were quite sparingly soluble in the usual solvents. The reaction involved may be represented as follows:

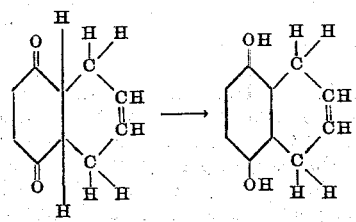

The hydroquinone formed is not quite as good an age resister as the quinone, probably due to the higher melting point and lower solubility in rubber of the former, but it is still somewhat better than phenyl-beta-naphthylamine.

What is claimed is:

1. A method of treating rubber which comprises vulcanizing it in the presence of a tetrahydro polycyclic quinone of condensed ring structure.

2. A method of treating rubber which comprises vulcanizing it in the presence of a tetrahydronaphthoquinone.

3. A method of treating rubber which comprises vulcanizing it in the presence of an octahydroanthraquinone.

4. A method of treating rubber which comprises vulcanizing it in the presence of 4a,5,8,8a-tetrahydronaphthoquinone-1,4.

5. A rubber product which has been vulcanized in the presence of a tetrahydro polycyclic quinone of condensed ring structure.

6. A rubber product which has been vulcanized in the presence of a tetrahydronaphthoquinone.

7. A rubber product which has been vulcanized in the presence of an octahydroanthraquinone.

8. A rubber product which has been vulcanized in the presence of 4a,5,8,8a-tetrahydronaphthoquinone-1,4.

RUTH P. SCOTT,
*Executrix of the Last Will and Testament of Winfield Scott, Deceased.*